US010055648B1

United States Patent
Grigsby et al.

(10) Patent No.: US 10,055,648 B1
(45) Date of Patent: Aug. 21, 2018

(54) DETECTION, CLASSIFICATION, AND TRACKING OF SURFACE CONTACTS FOR MARITIME ASSETS

(71) Applicant: BAE SYSTEMS Information and Electronic Systems Integration Inc., Nashua, NH (US)

(72) Inventors: Will R. Grigsby, Austin, TX (US); Eric Louchard, Miami, FL (US); David J. Schorr, Austin, TX (US); Mitchell J. Nord, Round Rock, TX (US); Joseph McGaughey, Austin, TX (US); Somit S. Mathur, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 189 days.

(21) Appl. No.: 15/130,227

(22) Filed: Apr. 15, 2016

Related U.S. Application Data

(60) Provisional application No. 62/148,247, filed on Apr. 16, 2015.

(51) Int. Cl.
*G06K 9/00* (2006.01)
*G06K 9/62* (2006.01)

(52) U.S. Cl.
CPC ....... *G06K 9/00771* (2013.01); *G06K 9/6267* (2013.01)

(58) Field of Classification Search
None
See application file for complete search history.

(56) References Cited

U.S. PATENT DOCUMENTS

| 8,941,728 B2 | 1/2015 | Zitterbart et al. |
| 2006/0208169 A1* | 9/2006 | Breed .............. B60N 2/002 250/221 |

(Continued)

OTHER PUBLICATIONS

Voles et al., "Maritime Scene Segmentation", Machine Vision Group, School of DEC, Bournemouth University, http://homepages.inf.ed.ac.uk/rbf/CVonline/LOCAL_COPIES/VOLES/marine.html, accessed on Mar. 29, 2016, 8 pages.

(Continued)

*Primary Examiner* — Weiwen Yang
(74) *Attorney, Agent, or Firm* — Finch & Maloney PLLC

(57) ABSTRACT

Techniques are provided for detection, classification and tracking of surface contacts based on multispectral image data from sensors on maritime assets. An example system may include an anomaly detection circuit configured to detect an object based on anomalies in the variance of pixels of water surface image data. The system may also include an object motion tracking circuit configured to analyze motion of the object relative to water surface waves. The analysis may compensate for motion of the asset and sensors. The system may further include an object classification circuit configured to classify the object as an object of interest, based on the analyzed motion of the object, and as a threat, further based on size estimation, edge detection, surface texture analysis, and volume analysis. The range from the asset to the object may be estimated based on the relation of the object to a detected or estimated horizon line.

21 Claims, 10 Drawing Sheets

(56) References Cited

U.S. PATENT DOCUMENTS

| | | | |
|---|---|---|---|
| 2014/0050355 A1* | 2/2014 | Cobb | G06K 9/00771 |
| | | | 382/103 |
| 2014/0314270 A1* | 10/2014 | Nguyen | G06K 9/0063 |
| | | | 382/103 |
| 2015/0104064 A1 | 4/2015 | Guissin et al. | |

OTHER PUBLICATIONS

Frost et al., "Detection and Tracking of Moving Objects in a Maritime Environment Using Level Set With Shape Priors", School of Engineering, University of KwaZulu-Natal South Africa, EURASIP Journal on Image and Video Processing, Dec. 2013, vol. 2013, No. 1, 16 pages.

Villeneuve et al., "Improved Matched-Filter Detection Techniques", Space Computer Corporation, Los Alamos National Laboratory, SPIE Proceedings, vol. 3753, Proc. SPIE3753, Imaging Spectrometer V, 278 (Oct. 27, 1999); doi:10.1117/12.366290, 8 pages.

Canny, "A Computational Approach to Edge Detection", IEEE Transactions on Pattern Analysis and Machine Intelligence, vol. PAMI-8, No. 6, Nov. 1986, 20 pages.

* cited by examiner

Classification
308

Edge
Detection
602

Surface
Texture Analysis
604

Volume
Analysis
606

DETECTION, CLASSIFICATION, AND TRACKING OF SURFACE CONTACTS FOR MARITIME ASSETS

CROSS-REFERENCE TO RELATED APPLICATIONS

This Application claims the benefit of U.S. Provisional Patent Application No. 62/148,247, filed on Apr. 16, 2015, which is herein incorporated by reference in its entirety.

FIELD OF DISCLOSURE

The present disclosure relates to detection and tracking of surface contacts from maritime assets, and more particularly, to detection and tracking of unknown surface contacts having low radar cross section from maritime assets including surface vessels and platforms.

BACKGROUND

Sea surface objects, such as small boats, floating surface mines, and other maritime hazards, may present a low radar cross section (RCS) and/or exhibit signatures that are challenging to detect using electro-optic or infrared (EO/IR) sensors. These objects constitute threats to naval and other maritime assets, vessels, or platforms, particularly in littoral zones. Existing methods for addressing this problem typically include the deployment of numerous watch standers to manually survey the ocean surface from ship to horizon for potential threats, using binoculars or analog video feeds. This manual process, however, is labor intensive, and fatigue can reduce the effectiveness and timeliness of threat detection and classification. Additionally, environmental effects such as glint, waves and white caps can further reduce the reliability of such manual surveillance techniques.

SUMMARY

One example embodiment of the present disclosure provides a processor-implemented method for object detection and tracking. The method includes receiving image data from one or more multispectral imaging sensors associated with a maritime asset and detecting the object based on anomalies in the variance of pixels in the image data. The method also includes analyzing motion of the object relative to surface waves. In some embodiments, the motion analysis may compensate for motion of the asset and the associated sensors. The method further includes classifying the object as an object of interest based on the analyzed motion. In some embodiments, a horizon line is detected (and/or projected from attitude sensor data) in the image data and a range to the object is estimated based on the location of the object in the image data relative to the horizon line. In some further embodiments, the object of interest may be classified as a threat based on estimation of size, velocity magnitude and/or direction, and location, and further based on edge detection, surface texture analysis, and volume analysis.

Another example embodiment of the present disclosure provides a system for object detection and tracking. The system includes ananomaly detection circuit configured to detect the object based on anomalies in the local variance of groups or blocks of pixels in image data received from one or more multispectral imaging sensors associated with a maritime asset. The system also includes an object motion tracking circuit configured to analyze motion of the object relative to surface waves. In some embodiments, the motion analysis may compensate for motion of the asset and the associated sensors. The system further includes an object classification circuit configured to classify the object as an object of interest based on the analyzed motion of the object. In some embodiments, the variance anomaly detection circuit is further configured to detect (or project from attitude or other sensor data) a horizon line in the image data and estimate a range to the object based on the location of the object in the image data relative to the horizon line. In some further embodiments, the object classification circuit is further configured to classify the object of interest as a threat based on one or more of size estimation, velocity, location, edge detection, surface texture analysis, and volume analysis. In some such embodiments, the imaged object (including any of its features noted above, such as size, edges, surface textures, and volume) can be compared to images of known objects that have been pre-classified as threats. If the feature(s) of the suspect object are similar to the feature(s) of the known object, then a match can be declared. Any number of known classification-based matching techniques can be used.

Yet another example embodiment of the present disclosure provides computer readable storage medium having instructions encoded thereon that, when executed by one or more processors, result in operations for object detection and tracking. The operations include receiving image data from one or more multispectral imaging sensors associated with a maritime asset and detecting the object based on anomalies in the variance of pixels in the image data. The operations also include analyzing motion of the object relative to surface waves. In some embodiments, the motion analysis may compensate for motion of the asset and the associated sensors. The operations further include classifying the object as an object of interest based on the analyzed motion. In some embodiments, a horizon line is detected (and/or projected from attitude sensor data) in the image data and a range to the object is estimated based on the location of the object in the image data relative to the horizon line. In some further embodiments, the object of interest may be classified as a threat based on performance of size estimation, edge detection, surface texture analysis, and volume analysis.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for detection, classification and tracking of surface contacts in a relatively automated manner. The techniques may operate, for example, on multispectral image data received from one or more imaging sensors on a maritime asset. Maritime assets may include any floating or fixed maritime object such as a ship, vessel, platform, buoy, and the like, including for example, an oil rig. The terms "maritime asset" and "maritime vessel" may be used interchangeably herein. In some embodiments, filtering of environmental effects, such as, for example, glint, waves and whitecaps, may be implemented along with clutter rejection and contrast enhancement to improve detection and classification performance. Passive ranging techniques are also disclosed which may provide range estimates to assess response times for engagement of a threat and to estimate closing velocity between the vessel and the object.

In accordance with an embodiment, geolocation of the target may include techniques for compensation of vessel and sensor motion based on data provided by Global Positioning Systems (GPS) and inertial navigation systems (INS). As will be further appreciated in light of this disclosure, the techniques provided herein may provide for the fusion of multiple target tracks over a period of time based on the data or reports from the multiple sensors.

The techniques described herein may utilize any combination of existing and/or new imaging sensors on the vessel, according to some embodiments. As will be appreciated in light of this disclosure, the techniques provided herein may provide for increased security for vessels, platforms and ports, and may additionally facilitate search and rescue operations, through improved detection of threats, hazards, overboard personnel or cargo, etc. Examples of threats may include floating mines, enemy craft and pirates. Examples of other hazards may include garbage and icebergs. The techniques may provide for generally increased reliability and efficiency through the reduction of manual effort compared to existing methods, as will be further appreciated in light of this disclosure. Additionally, these techniques can be implemented in hardware or software or a combination thereof.

Figure 1:
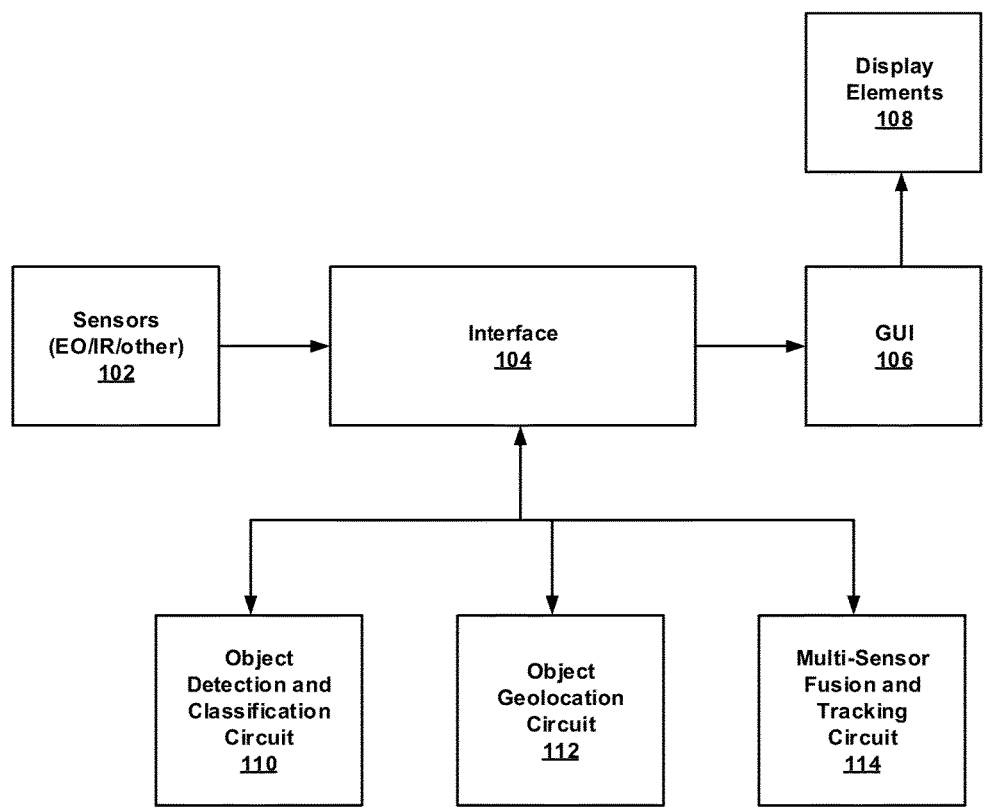
FIG. 1 is a top level block diagram of an object detection and tracking system, configured in accordance with certain of the embodiments disclosed herein.

FIG. 1 is a top level block diagram 100 of an object detection and tracking system, configured in accordance with certain of the embodiments disclosed herein. The system is shown to include sensors 102, an object detection and classification circuit 110, an object geolocation circuit 112, a multi-sensor fusion and tracking circuit 114, a graphical user interface (GUI) 106, display elements 108 and an interface 104 configured to interconnect these components.

The sensors 102 may be configured to provide imaging data of the sea surface surrounding the vessel or platform in any direction out to the horizon, including objects that are on or above the horizon, yet still on the water. Some types of threats/hazards may include objects that occlude portions of the horizon line due to their size, such as, for example, the superstructure of a ship that projects above the horizon. The sensors may include, for example, electro-optic (EO) sensors, infrared (IR) sensors, radar sensors, laser sensors, or any other suitable type of sensor, and may therefore operate in different spectral regions (i.e., multispectral sensors). The various sensors may provide different levels of image resolution from relatively lower resolution to relatively higher resolution. In some embodiments, the sensors may be incorporated in pre-existing vessel systems, for example, navigation systems, weapons systems, etc. Interface circuit 104 may be configured to provide a common interface mechanism that can be shared by the sensors, whether pre-existing or new, to enable the circuit 110, 112, 114, etc. to receive image data and otherwise communicate with the sensors.

The object detection and classification circuit 110 may be configured to perform image processing on the received sensor data to improve the quality of the data and to analyze the image pixels to detect and recognize signatures associated with potential targets, as will be described in greater detail below. In some embodiments, object classification may include measurement of the persistence of contacts across multiple frames of image data to filter out transient objects, such as breaking waves or boat wakes. For example, a clutter rejection circuit may be implemented to apply a spatial and temporal filter to the detection data prior to generation of target tracks. A temporal threshold may be selected to require that a target be detected in a certain minimum number of image frames to establish a track, and a spatial threshold may be selected to distinguish multiple targets as being associated with separate tracks.

The object geolocation circuit 112 may be configured to determine the position and relative motion of the vessel based on data provided, for example, from a global positioning system and/or the vessel's inertial navigation system or other suitable source. Additionally, in some embodiments, the sensors may be configured with circuits to generate pointing vectors to provide information indicating the orientation or relative direction in which the sensor was pointed while collecting image data. The pointing vectors may be provided as metadata that is coupled with the image data. Metadata may also include other information such as, for example, time stamps and sensor calibration data. Knowledge of the position and motion of the vessel along with the relative position of the sensor on the vessel and the sensor pointing vector may allow for the estimation of the location of a detected object in real-world coordinates, for example latitude and longitude.

The multi-sensor fusion and tracking circuit 114 may be configured to estimate kinematic states and generate tracks for each of the objects. In some embodiments, the multi-sensor fusion and tracking circuit 114 may be configured to implement a multiple hypothesis tracker to combine available information from multiple sensors and solve the joint problem of correlating reports across multiple tracks. Tracks that are determined to be generated by the same object may be combined and a tracking history maintained. The tracks may be specified as a sequence of latitude and longitude values.

The graphical user interface (GUI) 106 may be configured to provide graphical information to operators or other users of the system on the display elements 108. Such information may include raw and/or processed image data from one or more of the sensors. The displayed information may also include a classification, estimated range and track of detected objects or surface contacts, for example as an overlay with the image data or in any suitable format of the operator's choosing. Additional information including maps or charts, alerts and operator notations may also be displayed. In some embodiments the graphical information may be displayed in a moving map format corresponding to the motion of the vessel. The graphical information may also be stored for future reference or replay.

Figure 2:
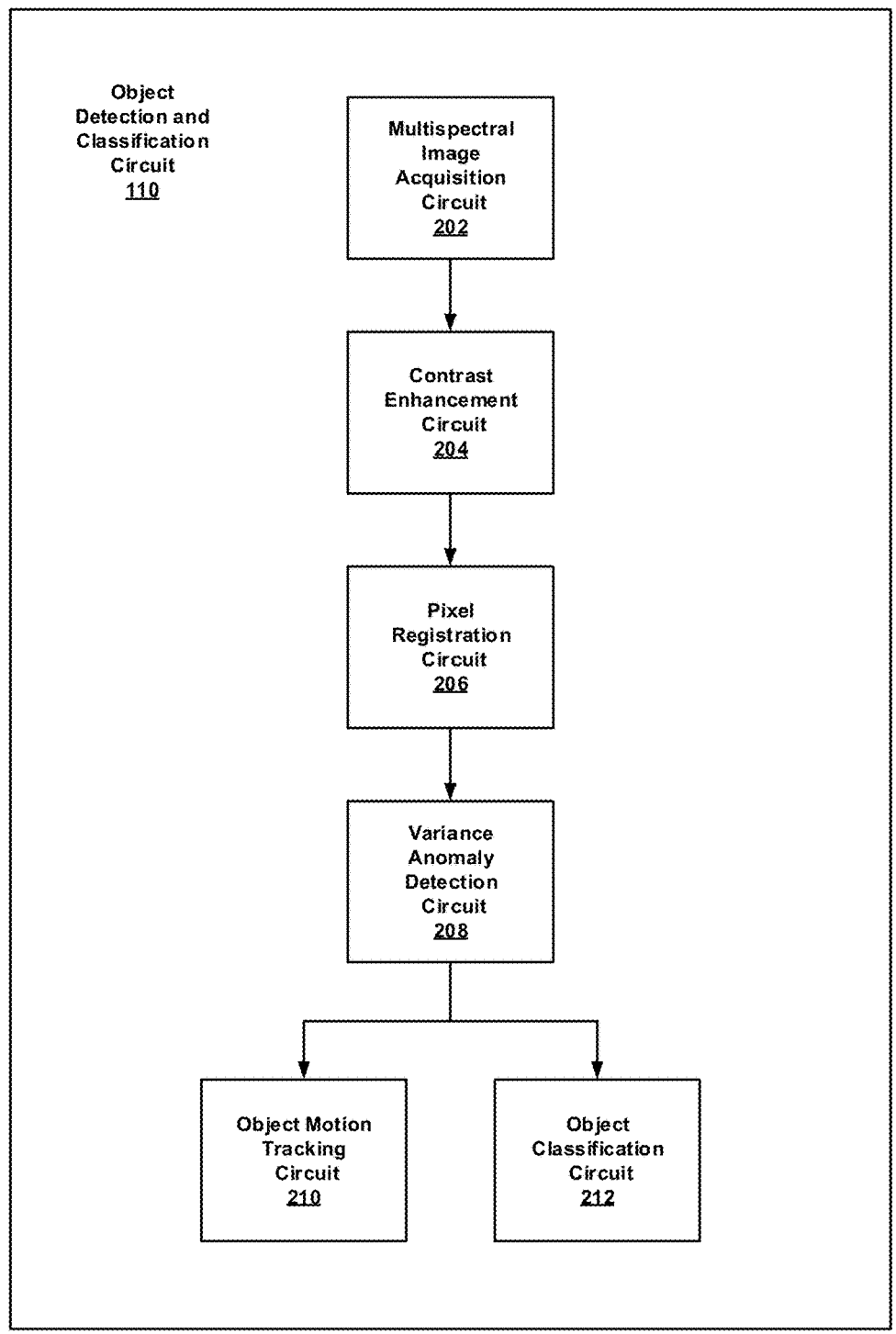
FIG. 2 is a more detailed block diagram of an object detection and classification circuit, configured in accordance with certain of the embodiments disclosed herein.

FIG. 2 is a more detailed block diagram of the object detection and classification circuit 110, configured in accordance with certain of the embodiments disclosed herein. The object detection and classification circuit 110 is shown to include a multispectral image acquisition circuit 202, a contrast enhancement circuit 204, a pixel registration circuit 206, a variance anomaly detection circuit 208, an object motion tracking circuit 210 and an object classification circuit 212.

The multispectral image acquisition circuit 202 may be configured to receive the image data from the sensors, for example in a multispectral format (e.g., different spectral bands including electro-optic, infrared, radar, laser, etc.). Although the processing techniques described herein refer to spectral bands of visible light (e.g., red-green-blue or RGB provided by an EO sensor) and infrared (short, medium and/or long wavelength IR provided by an IR sensor), it will be appreciated that these techniques may generally be applied to imaging in other spectral bands. In some embodiments, the image data may include full motion video and may be provided at relatively high frame rates, for example in the range of 30 frames per second or more.

The contrast enhancement circuit 204 may be configured to perform adaptive contrast enhancement on the image data to improve detection and classification performance. In some embodiment, the contrast enhancement may be achieved by reducing the dynamic range of the sensor to more closely match the dynamic range that the display elements are capable of reproducing, improving the clarity and detail of the images. In some embodiments, additional image processing may be performed, including, for example, filtering of image artifacts associated with environmental effects such as glint, waves and whitecaps.

The pixel registration circuit 206 may be configured to register or spatially align pixels between the image data received from the multiple imaging sensors. In some embodiments, the data from each sensor may be spatially combined into a hyperspectral cube to aid subsequent analysis. The alignment may be performed in pixel space and may include distortion correction, rotation, scaling, and pixel shifts using one sensor as a reference. Pixel interpolation may also be applied to reduce aliasing in the imagery, which could otherwise mask distant and/or faint targets.

The variance anomaly detection circuit 208 may be configured to detect objects or surface contacts against a background based on anomalies in the variance of the pixels in segmented sections of image data received from the vessel's sensors. In some embodiments, the variance anomaly detection circuit 208 may apply size aspect filters to the image data to improve performance. The variance anomaly detection circuit 208 may further be configured to detect a horizon line in the image data and passively estimate a range to the object based on the location of the object in the image data relative to the horizon line. The range estimate may be used to assess response times for engagement of a threat and to estimate the closing velocity between the vessel and the object. An embodiment of the variance anomaly detection circuit 208 will be described in greater detail below, in connection with FIG. 7.

The object motion tracking circuit 210 may be configured to analyze the motion of the object relative to surface waves over a relatively short time period. For example, objects on the surface may bob up and down and side to side in an elliptical motion in response to wave action. The characteristics of this motion, or "short time dynamics," may depend on the size and weight of the object. These short time dynamics may be compared and matched to expected dynamics of objects of interest. In some embodiments, the object motion analysis may include compensation for the motion of the vessel and the associated sensors, as determined, for example by object geolocation circuit 112.

The object classification circuit 212 may be configured to classify the object as an object of interest based on the analyzed motion of the object. For example, the motion analysis may indicate that the object is relatively dense and therefore of greater concern. In some embodiments, the object classification circuit 212 may be further configured to perform additional image processing operations including one or more of edge detection, surface texture analysis, and volume analysis. The object classification circuit 212 may classify the object of interest as a potential threat based on these analytical operations. Examples of threats may include mines and small crafts.

Figure 3:
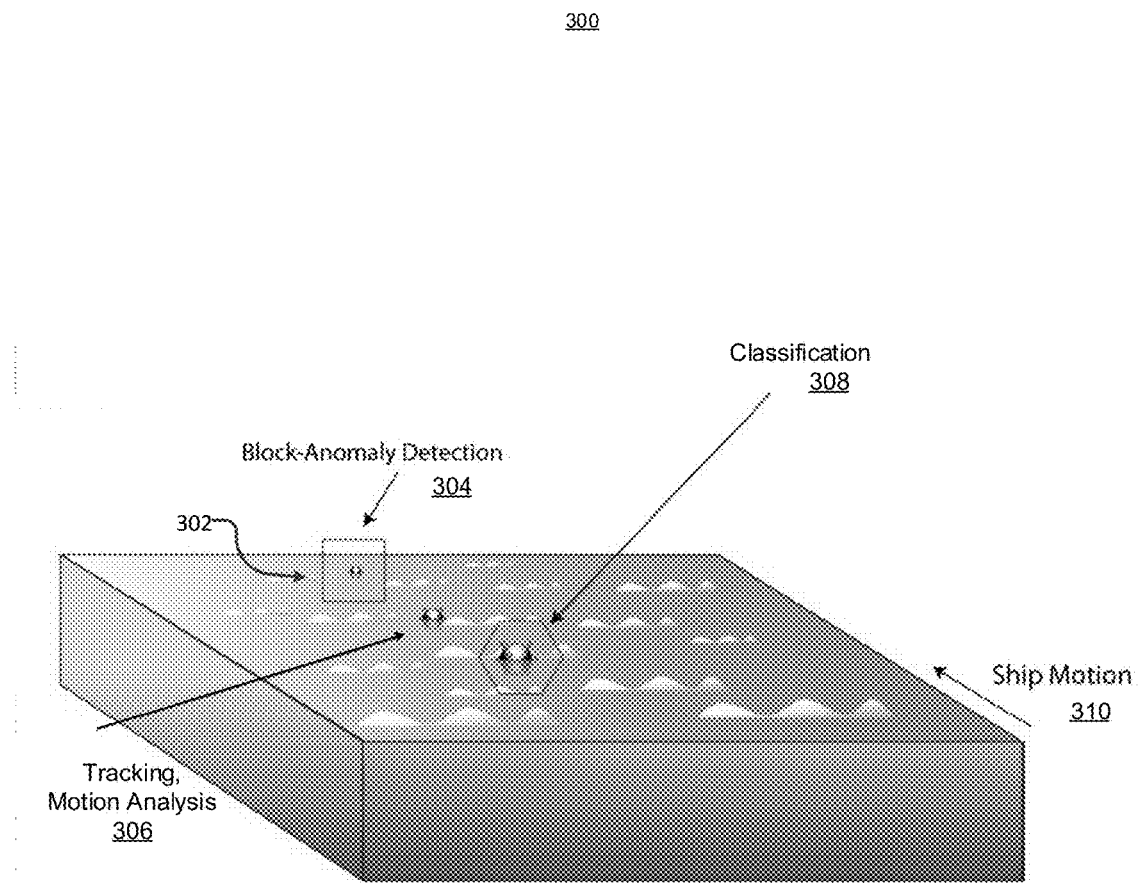
FIG. 3 illustrates an object detection scenario, in accordance with certain of the embodiments disclosed herein.

FIG. 3 illustrates an object detection scenario 300, in accordance with certain of the embodiments disclosed herein. An object 302 is shown on the water surface within a region, through which a ship is traveling (illustrated, for example, as ship motion 310). An initial detection 304 may occur at a relatively greater distance, for example approximately 2500 meters. Subsequent processing operations, including object tracking and motion analysis 306, may be performed as the ship closes in on the object, with classification 308 occurring at a relatively closer range of approximately 1000 meters, in this example.

Figure 4:
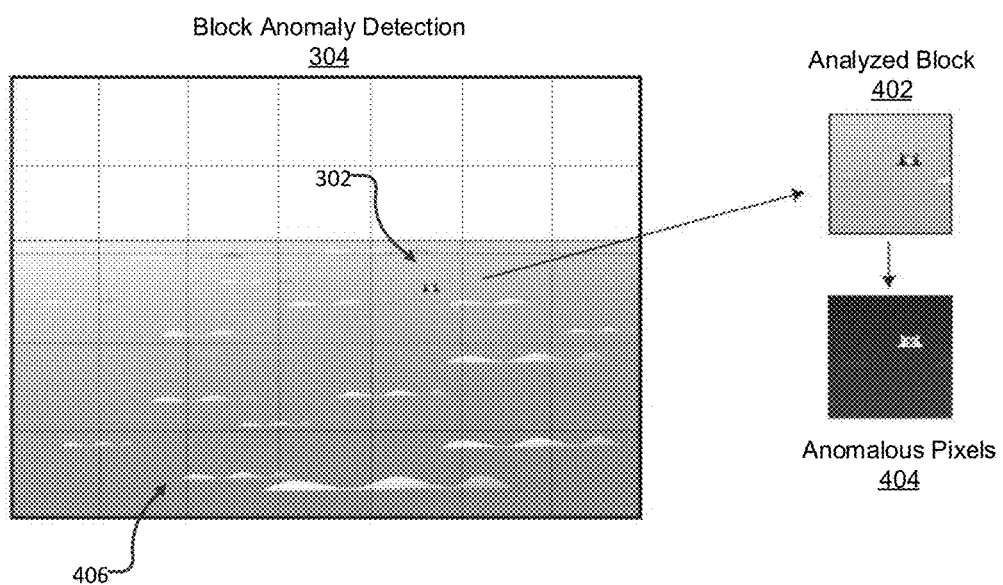
FIG. 4 illustrates block anomaly detection, in accordance with certain of the embodiments disclosed herein.

The initial block anomaly detection 304 is illustrated in greater detail in FIG. 4, where the image data is segmented into analysis regions or blocks of pixels 406. One of the blocks under analysis 402 includes the object 302. Anomalous pixels 404 are identified against the background pixels, for example by variance anomaly detection circuit 208.

Figure 5:
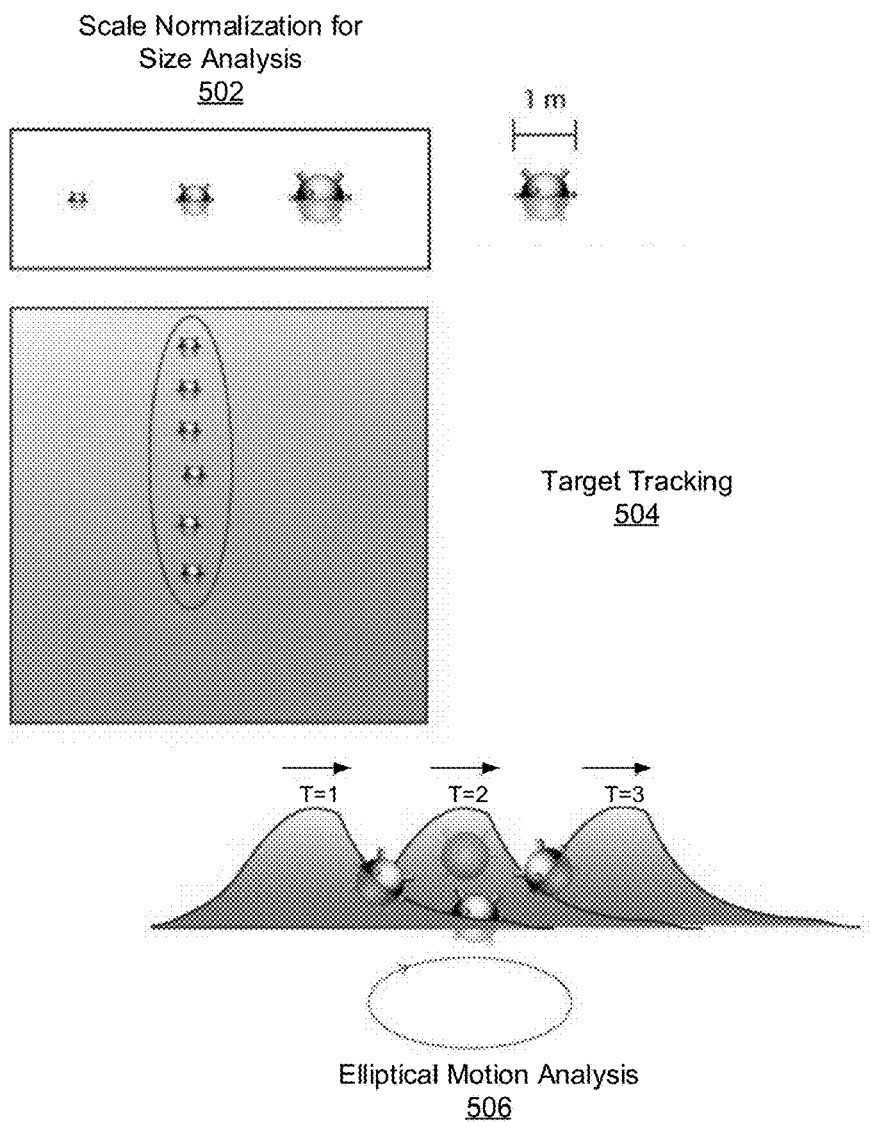
FIG. 5 illustrates target tracking and motion analysis, in accordance with certain of the embodiments disclosed herein.
Figure 6:
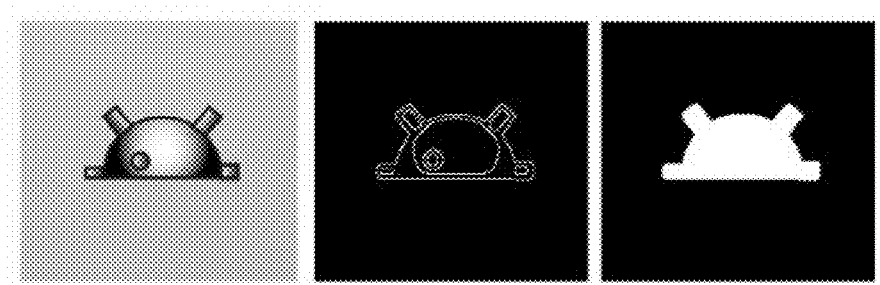
FIG. 6 illustrates object classification, in accordance with certain of the embodiments disclosed herein.

FIG. 5 illustrates target tracking and motion analysis, in accordance with certain of the embodiments disclosed herein. As shown in 502, the scale of the image may be normalized to facilitate size analysis of the object. The motion of the target along the surface of the water may be tracked over a period of time 504 to determine a drift vector of the object relative to the ship motion. The drift vector may be useful to filter out biologics from consideration. The elliptical motion of the target over time 506 is also illustrated. Analysis of this motion may be useful to filter out or distinguish relatively light floating objects and biologics from heavier objects such as mines. FIG. 6 illustrates object classification 308, in accordance with certain of the embodiments disclosed herein. Classification may be based, for example, on one or more of edge detection 602, surface texture analysis 604, and volume analysis 606.

Figure 7:
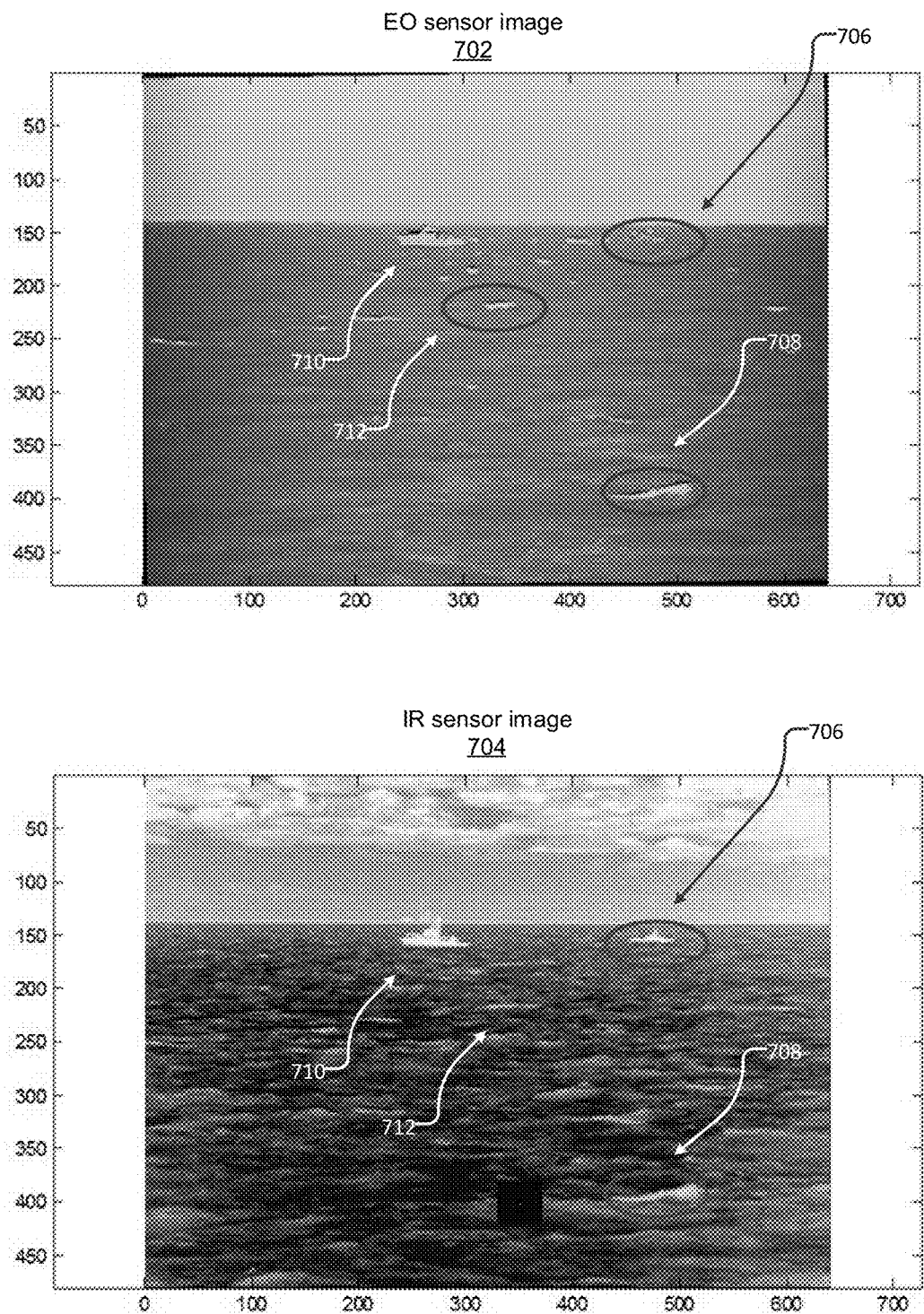
FIG. 7 illustrates an example of EO and IR sensor images, in accordance with certain of the embodiments disclosed herein.

FIG. 7 illustrates an example of an EO sensor image 702 and an IR sensor image 704 for comparison, in accordance with certain of the embodiments disclosed herein. The images include two small boats 710 and 706 as well as windblown whitecaps 712 and 708. As can be seen in these examples, the whitecaps may be difficult to distinguish from the boats, particularly the smaller boat 706. Pixels near the bottom of the image are approximately 100 meters from the sensors while pixels at or near the horizon are 10-15 km away, depending on camera height above the water surface. A small boat at a range of 1-2 km appears similar to a whitecap at 100-200 meters. Whitecaps and waves may also vary in appearance in different regions of the image.

Figure 8:
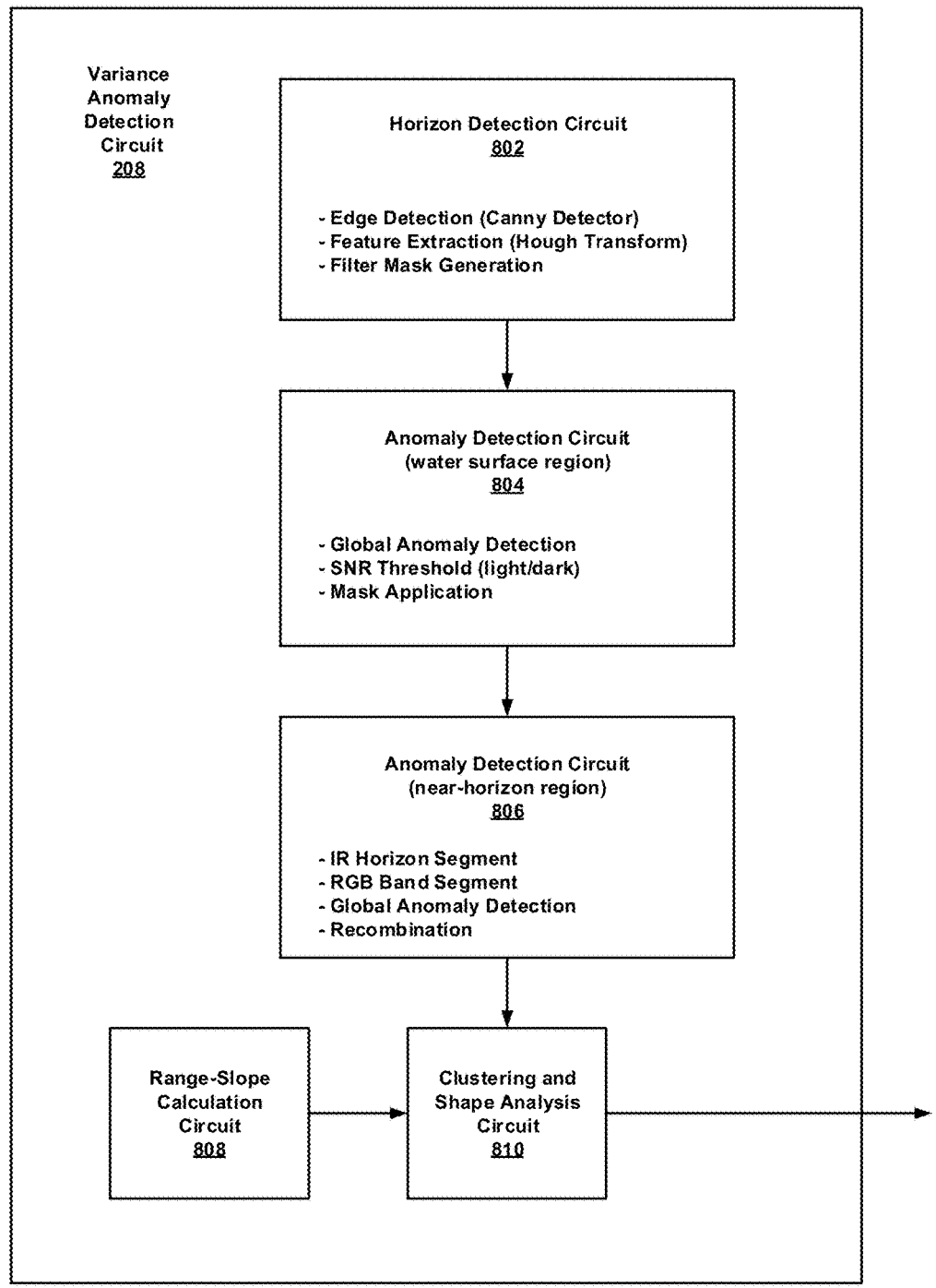
FIG. 8 is a more detailed block diagram of the variance anomaly detection circuit, configured in accordance with certain of the embodiments disclosed herein.

FIG. 8 is a more detailed block diagram of the variance anomaly detection circuit 208, configured in accordance with certain of the embodiments disclosed herein. The variance anomaly detection circuit 208 is shown to include a horizon detection circuit 802, an anomaly detection circuit 804 configured to operate on the water surface region of the images (e.g., the main image region), an anomaly detection circuit 806 configured to operate on the near-horizon region of the images, a range-slope calculation circuit 808 and a clustering and shape analysis circuit 810.

The horizon detection circuit 802 may be configured to perform edge detection on the images, for example using a Canny edge detector or other known techniques in light of the present disclosure. The edge detector may generate a number of connected and/or unconnected lines in the image. A Hough transform may be applied to extract feature patterns associated with these lines to determine the straightest, longest and highest line in the image which should generally be associated with the horizon. A filter mask may then be generated to filter out the sky above the horizon, as well as any other image regions that are determined to not be of interest during subsequent detection processing. A glint filter may also be generated to mask or reduce glint reflections (e.g., from breaking waves, boat wakes or other clutter sources) that could cause false detections. The glint filter/mask is generated from a ratio of spectral bands which exploits the relative "coolness" of sea foam and glint in the IR image compared to the relative brightness in the red channel of the RGB image.

In some embodiments, the horizon detection circuit 802 may also be configured to estimate the horizon based on analytical information provided by the INS system and geometry including, for example, the height of the sensor above water.

The anomaly detection circuit 804 may be configured to detect pixel anomalies that may be associated with objects or targets in segments of the main region of the image (e.g., from the sea surface away from the horizon region). The anomalies are detected using statistical techniques that distinguish pixels which differ from the background by more than a selected threshold. In some embodiments, the threshold may be based on an estimate of the signal to noise ratio of the image data. The characteristics of the image backgrounds tend to vary more significantly along the vertical axis of the image (i.e., top to bottom or far to near) than along the horizontal axis (i.e., left to right). This can be seen for example in the images of FIG. 7. For this reason, anomaly detection circuit 804 may be configured to process each horizontal row (or small number of rows) of pixels is de-trended to eliminate slowly changing background bias. De-trending may be accomplished with a polynomial fit or other low pass spatial filter. Each pixel row (or group of rows) may have a different anomaly detection threshold based on the residual background after de-trending. The anomaly detection circuit 804 may be configured to generate an anomaly bitmap of detected anomalous pixels. The filter masks previously generated by circuit 802 may applied to this bitmap.

The anomaly detection circuit 806 may be configured to detect pixel anomalies that may be associated with objects or targets in segments of the image near the detected horizon. Near the horizon, RGB and IR images can vary greatly in contrast due to atmospheric and aerosol scattering effects, attenuation, illumination conditions that causing vignetting and/or shadowing in the water. For this reason anomaly detection circuit 806 analyzes each spectral band (RGB, IR) separately. To help reduce variations in contrast within each sensor region, the circuit may calculate and subtract out the low-frequency spatial variations from each row of pixels. After removal of this "non-uniformity," each spectral band is analyzed for anomalies in the same manner as described above for circuit 804. The resulting anomaly bitmaps for each spectral band may then be recombined for subsequent processing operations.

The range-slope calculation circuit 808 may be configured to calculate a relationship between the range to a point on the water surface and the distance of that point below the horizon. Points closer to the horizon lie at a greater range than points further below the horizon which would be closer to the ship. This calculation is based on the field of view of the sensor and the elevation of the sensor above the water surface level. When the range of the object is calculated, the size of the object may be estimated based on the width of the object, for example in pixels, along a row of the image. In other words, as an object moves closer to the ship it moves down in the image relative to the horizon and its width increases.

The clustering and shape analysis circuit 810 may be configured to further process the anomaly bitmaps which indicate pixels that correspond to potential detections. These pixels are grouped using a clustering technique to determine the boundaries of the extent of each potential object. In some embodiments, the clustering may be based on an R-Tree clustering algorithm. The clusters are filtered by their shape characteristics (area, axis ratio, pixel density) which, for objects in the water, are scaled by the distance from the horizon, using the range-slope relationship provided by circuit 808. For surface targets, the detected intersection of the object with the waterline is a key feature upon which object geolocation is based. Object geolocation calculates a passive range to the object from the pixel location at the waterline with respect to the horizon, based on the sensor geometry and height above water. This range estimate may be updated and filtered to smooth out variations due to motion of the target and the host vessels, as well as drift and uncertainty associated with the inertial measurement unit.

Methodology

Figure 9:
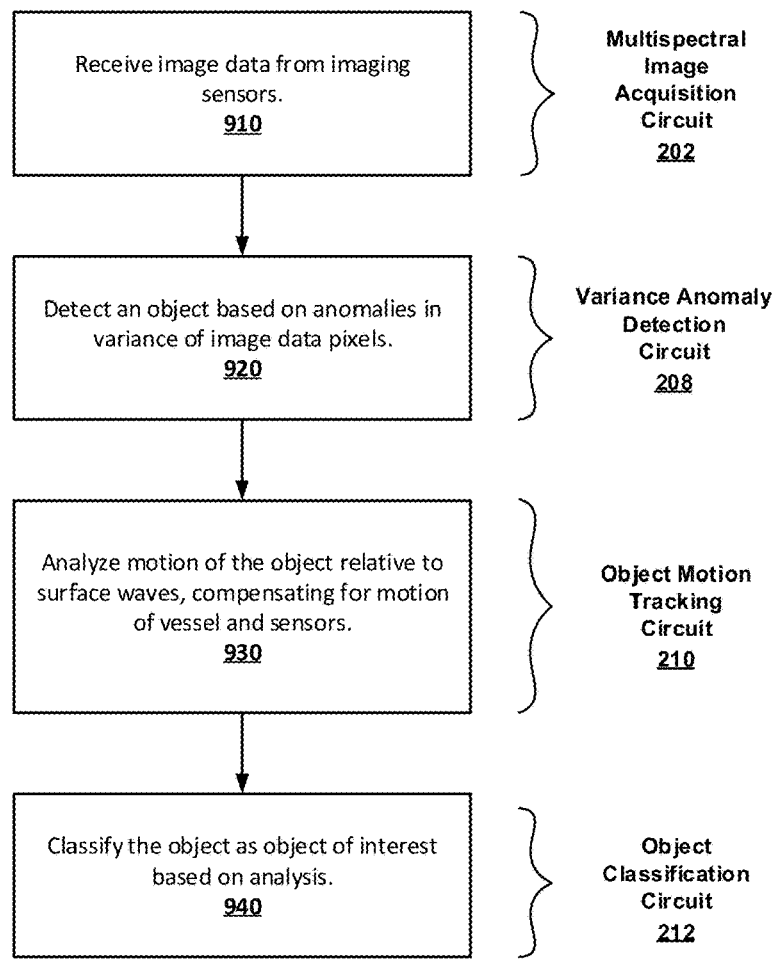
FIG. 9 is a flowchart illustrating a methodology for object detection and tracking, in accordance with certain of the embodiments disclosed herein.

FIG. 9 is a flowchart illustrating an example method 900 for detection and tracking of surface contacts based on multispectral image data from sensors on maritime vessels, in accordance with an embodiment of the present disclosure. As can be seen, example method 900 includes a number of phases and sub-processes, the sequence of which may vary from one embodiment to another. However, when considered in the aggregate, these phases and sub-processes form a process for detection and tracking in accordance with certain of the embodiments disclosed herein. These embodiments can be implemented, for example using the system architecture illustrated in FIGS. 1 and 2 as described above. However other system architectures can be used in other embodiments, as will be apparent in light of this disclosure. To this end, the correlation of the various functions shown in FIG. 9 to the specific components illustrated in FIGS. 1, 2 and 8 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 900. Thus other embodiments may have fewer or more modules and/or sub-modules depending on the granularity of implementation. Numerous variations and alternative configurations will be apparent in light of this disclosure.

As illustrated in FIG. 9, in one embodiment, method 900 for detection and tracking commences, at operation 910, by receiving image data from one or more imaging sensors associated with the vessel. In some embodiments, the image data is multispectral and the sensors may include, for example, electro-optic sensors, infrared sensors, radar sensors, laser sensors and/or any other suitable type of sensor.

At operation 920, the surface contact or object is detected based on anomalies in the variance of the image data pixels. Next, at operation 930, the motion of the object relative to surface waves is analyzed. The may compensate or otherwise account for the motion of the vessel and the vessel's associated sensors. In some embodiments, the motion of the vessel and associated sensors may be based on data provided, for example, by a global positioning system, an inertial navigation system and/or pointing vector generator associated with the sensor.

At operation 940, the object may be classified as an object of interest based on the analyzed motion of the object. In some embodiments, the object of interest may be further classified as a threat based on one or more of edge detection, surface texture analysis, and/or volume analysis of the object of interest.

Of course, in some embodiments, additional operations may be performed, as previously described in connection with the system. These additional operations may include, for example, detecting a horizon line in the image data and estimating a range to the object based on the location of the object in the image data relative to the horizon line. In some embodiments, adaptive contrast enhancement may be performed on the image data to improve detection capabilities.

The pseudo-code listing, provided below, illustrates another example method for the performance of portions of the object detection and tracking tasks described previously, in accordance with an embodiment of the present disclosure:

Pseudo-Code Listing

Figure 10:
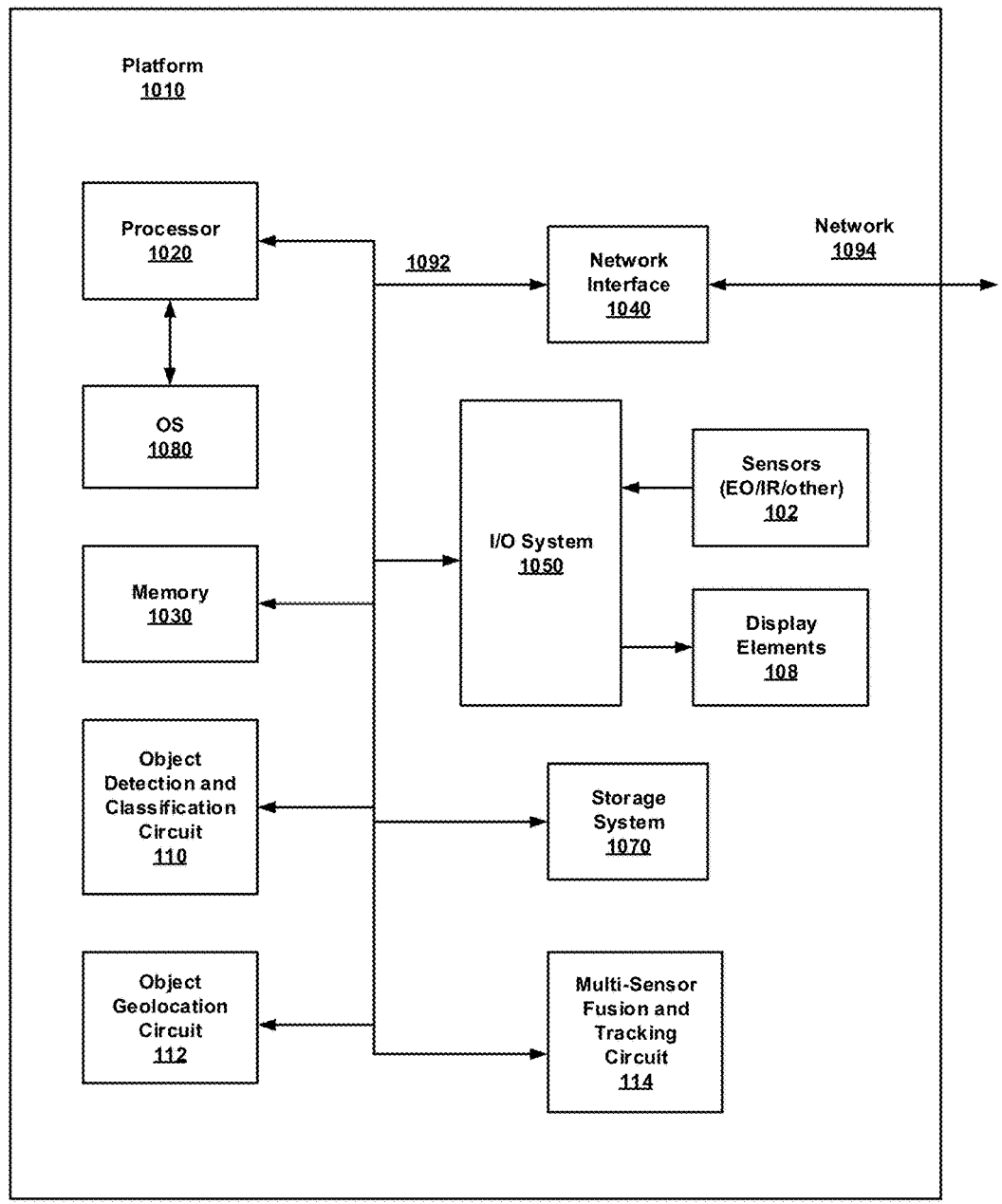
FIG. 10 is a block diagram schematically illustrating a system platform configured to perform object detection and tracking, configured in accordance with certain of the embodiments disclosed herein.

1. Obtain parameters
2. Select start and end frames
3. Load imagery
   a. Load RGB (red-green-blue) image
   b. Load MWIR (medium wavelength infrared) image
4. Rotate and Scale MWIR to align with RGB
5. Add MWIR layer to RGB array to create RGBM fused image cube (e.g. 640×480×4)
6. Normalize each band (row)—divide by the mean for that band
7. Detect Primary horizon in one of the bands
   a. Use least noisy band (usually Band 1)
   b. Run Canny Edge Detector
      i. Gaussian Blur
      ii. Canny Edge Detection
      iii. Mask out areas near side of image
      iv. Bloom the mask
   c. Cluster the points in Canny Image
      i. Neighborhood test or GetAdjacentCluster
   d. Run through each cluster and calculate slope every slopebin (e.g., 10)
      i. Mean slope per cluster
      ii. Standard deviation per cluster
      iii. Y-intercept
   e. Filter by pixel number in line, mean slope, stdev slope
      i. If multiple lines pass, choose the one with lowest stdev slope
      ii. If none pass—no horizon (Step f.)
   f. (if no image-based determination of horizon) Use horizon line calculated from INS system information and sensor geometry data
8. Create Filtmask, Ratiomask and Brightmask
   a. Filtmask is used to filter out anything above horizon or where RGB and MWIR do not overlap.
      i. Horizon line calculated from Y-intercept and slope
      ii. Horizon pixels obtained from Canny line
   b. Ratiomask has glint/foam and sky ratio
      i. Glint/foam (band 4/band 1)
      ii. Sky (band 4/band 3)
      iii. Edgeartifacts
   c. Brightmask is for Shadow Boat segment
      i. Use Filtmask as basis
      ii. Mask out pixels brighter than mean from Bright band (usually band 1)
9. Run Median Filter on RGBM image
10. Run Global anomaly detector on RGBM image to produce Bright FiltMap
    a. Threshold by SNR for bright objects
11. Run Shadow Boat segment to produce the Dark FiltMap
    a. Threshold by SNR for shadow object
12. Combine bright and shadow thresholded images into the main FiltMap
    a. Sum Bright and Dark Filtermap arrays
    b. Apply Filtmask, Ratiomask, Brightmask
13. Horizon Segmentation
    a. Cut out section of RGBM image around horizon line
       i. Cut out RGB and MWIR sections (RGB is usually band 1)
    b. Cut out section of FiltMask to generate Filtmask_Horizon_Line
    c. Cut out section of RatioMask to generate Ratiomask_Horizon_Line
    d. Run Global Anomaly Detector on both RGB and MWIR subsets
       i. Generate Anomaly Detector (AD) images
    e. Analyze RGB segment
       i. Create mask of pixels on the horizontal edges of the frame
       ii. Save subset of main FiltMap from horizon area
          1. Filter by RGB Horizon threshold to remove all but brightest pixels
       iii. Save segment of RGB image around the horizon line
       iv. De-trend RGB segment
          1. rotate image segment to make the horizon line horizontal across the image
          2. calculate background trend of each image row using 3-deg polynomial fit
          3. subtract polynomial line from each row
          4. run anomaly detector on de-trended RGB segment to make AD image
          5. Apply masks to AD Image
          6. Threshold by SNR with value specific for RGB segment
          7. Rotate filtered AD image back to match original image f. Analyze MWIR segment
  i. Save segment of MWIR image around the horizon line
  ii. De-trend MWIR segment
    1. rotate image segment to make the horizon line horizontal across the image
    2. calculate background trend of each image row using 3-deg polynomial fit
    3. subtract polynomial line from each row
    4. run anomaly detector on de-trended MWIR segment to make AD image
    5. Apply masks to AD Image
    6. Threshold by SNR with value specific for MWIR segment
    7. Rotate filtered AD image back to match original image
14. Combine FiltMap segments
  a. Sum RGB and MWIR FiltMaps to make Horizon FiltMap
  b. Replace section of the main FiltMap with the Horizon FiltMap to make FiltMap_Out
15. Target Detection
  a. Run R-tree clustering on FiltMap_Out
  b. Loop through clusters
    i. Calculate bottom of cluster
    ii. Calculate distance from bottom of cluster to Primary Horizon Line
    iii. Calculate Axis Ratio
    iv. Determine scale factors for axis ratio and area based on distance to horizon
    v. Filter clusters by axis ratio and area thresholds
    vi. Generate Clusterdets_Filtered_Basic
  c. Classify Detections
    i. Loop through Clusterdets_Filtered_Basic
    ii. Create image chip from FiltMap_Out
    iii. Chip size determined by size of initial cluster
    iv. Find target pixel indices for the cluster within the image chip
    v. Cluster filtered image using RegionProps
      1. Examine each cluster to determine size and distance to center of chip
      2. Pick cluster with centroid nearest to center of chip if size meets threshold
      3. Calculate cluster statistics
    vi. Generate Clusterdets_Analyzed
  d. Filter Clusterdets_Analyzed by area and axis ratio thresholds
    i. Thresholds vary by distance to horizon
  e. Make detlist with all cluster stats
    i. Save detlist
  f. Generate Bitmap with pixels from Clusterdets_Analyzed set to 1
    i. Create 640×480 array of zeros
    ii. Go through cluster pixel list and add 1 to array at each pixel
    iii. Save bitmap Example System FIG. 10 illustrates an example system 1000 configured to perform object detection and tracking, as described herein. In some embodiments, system 1000 comprises a platform 1010 which may host, or otherwise be incorporated into, a workstation, laptop computer, portable computer, handheld computer, tablet or any other suitable computing system. Any combination of different devices may be used in certain embodiments.

In some embodiments, platform 1010 may comprise any combination of a processor 1020, a memory 1030, a network interface 1040, an input/output (I/O) system 1050, sensors 102, display elements 108 and a storage system 1070, along with object detection and classification circuit 110, object geolocation circuit 112 and multi-sensor fusion and tracking circuit 114, as described herein. As can be further seen, a bus and/or interconnect 1092 is also provided to allow for communication between the various components listed above and/or other components not shown. Platform 1010 can be coupled to a network 1094 through network interface 1040 to allow for communications with other computing devices, platforms or resources. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor or a graphics processing unit, to assist in control and processing operations associated with system 1000. In some embodiments, the processor 1020 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor.

Memory 1030 can be implemented using any suitable type of digital storage including, for example, flash memory and/or random access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 1020 may be configured to execute an Operating System (OS) 1080 which may comprise any suitable operating system, such as, for example, Google Android (Google Inc., Mountain View, Calif.), Microsoft Windows (Microsoft Corp., Redmond, Wash.), Linux, Apple OS X (Apple Inc., Cupertino, Calif.) and/or various real-time operating systems. As will be appreciated in light of this disclosure, the techniques provided herein can be implemented without regard to the particular operating system provided in conjunction with system 1000, and therefore may also be implemented using any suitable existing or subsequently-developed platform.

Network interface circuit 1040 can be any appropriate network chip or chipset which allows for wired and/or wireless connection between other components of computer system 1000 and/or network 1094, thereby enabling system 1000 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1050 may be configured to interface between various I/O devices and other components of computer system 1000. I/O devices may include, but not be limited to, sensors 102, display elements 108, and other devices not shown such as a keyboard, mouse, microphone, speaker, etc.

I/O system 1050 may include a graphics subsystem configured to perform processing of images for display elements 108. Graphics subsystem may be a graphics processing unit or a visual processing unit (VPU), for example. An analog or digital interface may be used to communicatively couple graphics subsystem and display element 108. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 1020 or any chipset of platform 1010. In some embodiments, display element 108 may comprise any television type monitor or display. Display element 108 may comprise, for example, a computer display screen, touchscreen display, video monitor, television-like device, and/or a television. Display element 108 may be digital and/or analog. Under the control of the OS 1080 (or one or more software applications), platform 1010 may display sensor images and/or detection and tracking data on display element 108.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

Object detection and classification circuit 110, object geolocation circuit 112 and multi-sensor fusion and tracking circuit 114 are configured to perform detection and tracking of surface contacts based on multispectral image data from sensors on maritime vessels, in accordance with embodiments of the present disclosure. Circuits 110, 112 and 114 may include any or all of the components illustrated in FIGS. 1 and 2 and described above. Circuits 110, 112 and 114 can be implemented or otherwise used in conjunction with a variety of suitable software and/or hardware that is coupled to or that otherwise forms a part of system 1000. Circuits 110, 112 and 114 can additionally or alternatively be implemented or otherwise used in conjunction with user I/O devices that are capable of providing information to, and receiving information and commands from, a user. These I/O devices may include display element 108, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments object detection and classification circuit 110, object geolocation circuit 112 and multi-sensor fusion and tracking circuit 114 may be installed local to system 1000, as shown in the example embodiment of FIG. 10. Alternatively, system 1000 can be implemented in a client-server arrangement wherein at least some functionality associated with these circuits is provided to system 1000 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 1094 or remotely coupled to network 1094 by one or more other networks and/or communication channels. In some cases access to resources on a given network or computing system may require credentials such as usernames, passwords, and/or compliance with any other suitable security mechanism.

In various embodiments, system 1000 may be implemented as a wireless system, a wired system, or a combination of both. When implemented as a wireless system, system 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the detection and tracking methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1094. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1000 may comprise additional, fewer, or alternative subcomponents as compared to those included in the example embodiment of FIG. 10.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for object detection and tracking. The method comprises: receiving water surface image data from one or more imaging sensors associated with a maritime asset; detecting an object based on anomalies in variance of pixels in the image data; analyzing motion of the object relative to water surface waves, the analyzing further comprising compensation for motion of the asset and associated sensors; and classifying the object as an object of interest based on the analyzed motion of the object.

Example 2 includes the subject matter of Example 1, further comprising detecting a horizon line in the image data and estimating a range to the object based on the location of the object in the image data relative to the horizon line.

Example 3 includes the subject matter of Examples 1 or 2, further comprising classifying the object of interest as a threat based on one or more of size estimation, edge detection, surface texture analysis, and volume analysis of the object of interest.

Example 4 includes the subject matter of any of Examples 1-3, wherein the image data is multispectral and the sensors include one or more of: electro-optic sensors, infrared sensors, radar sensors and laser sensors.

Example 5 includes the subject matter of any of Examples 1-4, wherein the motion of the asset and associated sensors is determined based on data from one or more of a global positioning system, an inertial navigation system, and a sensor pointing vector generator.

Example 6 includes the subject matter of any of Examples 1-5, further comprising performing adaptive contrast enhancement on the image data.

Example 7 includes the subject matter of any of Examples 1-6, further comprising performing pixel registration on the image data to spatially align pixels between the image data from the imaging sensors.

Example 8 includes the subject matter of any of Examples 1-7, further comprising estimating kinematic states and generating tracks for each of the objects.

Example 9 is a system for object detection and tracking. The system comprises: a variance anomaly detection circuit to detect an object based on anomalies in variance of pixels in water surface image data received from one or more imaging sensors associated with a maritime asset; an object motion tracking circuit to analyze motion of the object relative to water surface waves, the analysis further comprising compensation for motion of the asset and associated sensors; and an object classification circuit to classify the object as an object of interest based on the analyzed motion of the object.

Example 10 includes the subject matter of Example 9, wherein the variance anomaly detection circuit is further to detect a horizon line in the image data and estimate a range to the object based on the location of the object in the image data relative to the horizon line.

Example 11 includes the subject matter of Examples 9 or 10, wherein the object classification circuit is further to classify the object of interest as a threat based on one or more of size estimation, edge detection, surface texture analysis, and volume analysis of the object of interest.

Example 12 includes the subject matter of any of Examples 9-11, further comprising a multispectral image acquisition circuit to receive the image data in a multispectral format; and the sensors include one or more of: electro-optic sensors, infrared sensors, radar sensors and laser sensors.

Example 13 includes the subject matter of any of Examples 9-12, further comprising an object geolocation circuit to determine the motion of the asset and associated sensors based on data from one or more of a global positioning system, an inertial navigation system and a sensor pointing vector generator.

Example 14 includes the subject matter of any of Examples 9-13, further comprising a contrast enhancement circuit to perform adaptive contrast enhancement on the image data.

Example 15 includes the subject matter of any of Examples 9-14, further comprising a pixel registration circuit to spatially align pixels between the image data from the imaging sensors.

Example 16 includes the subject matter of any of Examples 9-15, further comprising a multi-sensor fusion and tracking circuit to estimate kinematic states and generate tracks for each of the objects.

Example 17 is at least one non-transitory computer readable storage medium having instructions encoded thereon that, when executed by one or more processors, result in the following operations for object detection and tracking. The operations comprise: receiving water surface image data from one or more imaging sensors associated with a maritime asset; detecting an object based on anomalies in variance of pixels in the image data; analyzing motion of the object relative to water surface waves, the analyzing further comprising compensation for motion of the asset and associated sensors; and classifying the object as an object of interest based on the analyzed motion of the object.

Example 18 includes the subject matter of Example 17, the operations further comprising detecting a horizon line in the image data and estimating a range to the object based on the location of the object in the image data relative to the horizon line.

Example 19 includes the subject matter of Examples 17 or 18, the operations further comprising classifying the object of interest as a threat based on one or more observations inferred from the image data.

Example 20 includes the subject matter of any of Examples 17-19, wherein the image data is multispectral and the sensors include one or more of: electro-optic sensors, infrared sensors, radar sensors and laser sensors.

Example 21 includes the subject matter of any of Examples 17-20, wherein the motion of the asset and associated sensors is determined based on data from one or more of a global positioning system, an inertial navigation system and a sensor pointing vector generator.

Example 22 includes the subject matter of any of Examples 17-21, the operations further comprising performing adaptive contrast enhancement on the image data.

Example 23 includes the subject matter of any of Examples 17-22, the operations further comprising performing pixel registration on the image data to spatially align pixels between the image data from the imaging sensors.

Example 24 includes the subject matter of any of Examples 17-23, the operations further comprising estimating kinematic states and generating tracks for each of the objects.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for object detection and tracking, the method comprising:
receiving, by a processor, water surface image data from one or more imaging sensors associated with a maritime asset;
detecting, by the processor, an object based on anomalies in variance of pixels in the image data;
detecting, by the processor, a horizon line in the image data and estimating a range from the maritime asset to the object based on the location of the object in the image data relative to the horizon line;
analyzing, by the processor, motion of the object relative to water surface waves, the analyzing further comprising compensation for motion of the asset and associated sensors; and
classifying, by the processor, the object as an object of interest based on the estimated range and the analyzed motion of the object.

2. The method of claim 1, further comprising classifying the object of interest as a threat based on one or more of size estimation, edge detection, surface texture analysis, and volume analysis of the object of interest.

3. The method of claim 1, wherein the image data is multispectral and the sensors include one or more of: electro-optic sensors, infrared sensors, radar sensors and laser sensors.

4. The method of claim 1, wherein the motion of the asset and associated sensors is determined based on data from one or more of a global positioning system, an inertial navigation system, and a sensor pointing vector generator.

5. The method of claim 1, further comprising performing adaptive contrast enhancement on the image data.

6. The method of claim 1, further comprising performing pixel registration on the image data to spatially align pixels between the image data from the imaging sensors.

7. The method of claim 1, further comprising estimating kinematic states and generating tracks for each of the objects.

8. A system for object detection and tracking, the system comprising:
a variance anomaly detection circuit to detect an object based on anomalies in variance of pixels in water surface image data received from one or more imaging sensors associated with a maritime asset;
the variance anomaly detection circuit further to detect a horizon line in the image data and estimate a range from the maritime asset to the object based on the location of the object in the image data relative to the horizon line;
an object motion tracking circuit to analyze motion of the object relative to water surface waves, the analysis further comprising compensation for motion of the asset and associated sensors; and
an object classification circuit to classify the object as an object of interest based on the estimated range and the analyzed motion of the object.

9. The system of claim 8, wherein the object classification circuit is further to classify the object of interest as a threat based on one or more of size estimation, edge detection, surface texture analysis, and volume analysis of the object of interest.

10. The system of claim 8, further comprising a multispectral image acquisition circuit to receive the image data in a multispectral format; and the sensors include one or more of: electro-optic sensors, infrared sensors, radar sensors and laser sensors.

11. The system of claim 8, further comprising an object geolocation circuit to determine the motion of the asset and associated sensors based on data from one or more of a global positioning system, an inertial navigation system and a sensor pointing vector generator.

12. The system of claim 8, further comprising a contrast enhancement circuit to perform adaptive contrast enhancement on the image data.

13. The system of claim 8, further comprising a pixel registration circuit to spatially align pixels between the image data from the imaging sensors.

14. The system of claim 8, further comprising a multisensor fusion and tracking circuit to estimate kinematic states and generate tracks for each of the objects.

15. At least one non-transitory computer readable storage medium having instructions encoded thereon that, when executed by one or more processors, result in the following operations for object detection and tracking, the operations comprising:
receiving water surface image data from one or more imaging sensors associated with a maritime asset;
detecting an object based on anomalies in variance of pixels in the image data;
detecting a horizon line in the image data and estimating a range from the maritime asset to the object based on the location of the object in the image data relative to the horizon line;
analyzing motion of the object relative to water surface waves, the analyzing further comprising compensation for motion of the asset and associated sensors; and
classifying the object as an object of interest based on the estimated range and the analyzed motion of the object.

16. The computer readable storage medium of claim 15, the operations further comprising classifying the object of interest as a threat based on one or more observations inferred from the image data.

17. The computer readable storage medium of claim 15, wherein the image data is multispectral and the sensors include one or more of: electro-optic sensors, infrared sensors, radar sensors and laser sensors.

18. The computer readable storage medium of claim 15, wherein the motion of the asset and associated sensors is determined based on data from one or more of a global positioning system, an inertial navigation system and a sensor pointing vector generator.

19. The computer readable storage medium of claim 15, the operations further comprising performing adaptive contrast enhancement on the image data.

20. The computer readable storage medium of claim 15, the operations further comprising performing pixel registration on the image data to spatially align pixels between the image data from the imaging sensors.

21. The computer readable storage medium of claim 15, the operations further comprising estimating kinematic states and generating tracks for each of the objects.

* * * * *